United States Patent
Yamauchi et al.

(10) Patent No.: US 10,270,964 B2
(45) Date of Patent: Apr. 23, 2019

(54) CAMERA AND ILLUMINATION SYSTEM

(71) Applicant: Panasonic Intellectual Property Management Co., Ltd., Osaka (JP)

(72) Inventors: Kentaro Yamauchi, Osaka (JP); Kohji Hiramatsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 14/849,848

(22) Filed: Sep. 10, 2015

(65) Prior Publication Data
US 2016/0080619 A1 Mar. 17, 2016

(30) Foreign Application Priority Data

Sep. 12, 2014 (JP) .................... 2014-186198
Sep. 12, 2014 (JP) .................... 2014-186200

(51) Int. Cl.
| | | |
|---|---|---|
| H04N 5/232 | (2006.01) | |
| H04N 9/31 | (2006.01) | |
| G03B 41/00 | (2006.01) | |
| A63J 13/00 | (2006.01) | |

(52) U.S. Cl.
CPC .......... H04N 5/23222 (2013.01); A63J 13/00 (2013.01); G03B 41/00 (2013.01); H04N 9/3179 (2013.01); H04N 9/3194 (2013.01); G03B 2206/00 (2013.01); G03B 2215/0596 (2013.01)

(58) Field of Classification Search
CPC ....... H04N 5/2256; A63J 13/00; G03B 41/00; G03B 2206/00; G03B 2215/0596
USPC ......................................................... 348/370
See application file for complete search history.

(56) References Cited

U.S. PATENT DOCUMENTS

| | | | |
|---|---|---|---|
| 2010/0033588 A1* | 2/2010 | Thorn .................. | H04N 5/2354 348/222.1 |
| 2011/0157345 A1* | 6/2011 | Manico ..................... | H04N 5/30 348/61 |
| 2011/0236005 A1* | 9/2011 | Teshima ............. | H04N 5/23206 396/49 |

(Continued)

FOREIGN PATENT DOCUMENTS

| | | |
|---|---|---|
| JP | 2004-260305 | 9/2004 |
| JP | 2007-166352 | 6/2007 |

(Continued)

*Primary Examiner* — Lin Ye
*Assistant Examiner* — Chan T Nguyen
(74) *Attorney, Agent, or Firm* — Renner, Otto, Boisselle & Sklar, LLP

(57) ABSTRACT

A camera includes a data acquisition unit, a photographing area control unit, a photographing unit and a communication unit. The data acquisition unit acquires, as photographing information, at least one of time information, information on a position of the sun, information on an angle between a sunlight and a ground, and projection information of an external projection device. The photographing condition calculation unit calculates a photographing condition based on the photographing information. The photographing area control unit controls a photographing area based on the photographing condition. The photographing unit generates an image data by photographing the photographing area. The communication unit transmits the image data to the external projection device.

10 Claims, 7 Drawing Sheets

(56) References Cited

U.S. PATENT DOCUMENTS

2014/0078315 A1* 3/2014 Carlsson .............. H04N 5/232
                                                                                        348/187
2015/0229826 A1    8/2015 Ikeda et al.

FOREIGN PATENT DOCUMENTS

| JP | 2009-157897 | | 7/2009 | |
|----|----|----|----|----|
| JP | 2012-070069 | * | 9/2010 | ............ H04N 5/225 |
| JP | 2012-070069 | | 4/2012 | |
| JP | 2012-070069 | * | 5/2012 | ............ H04N 5/225 |
| JP | 5319999 | | 7/2013 | |
| JP | 2013-239861 | | 11/2013 | |

* cited by examiner

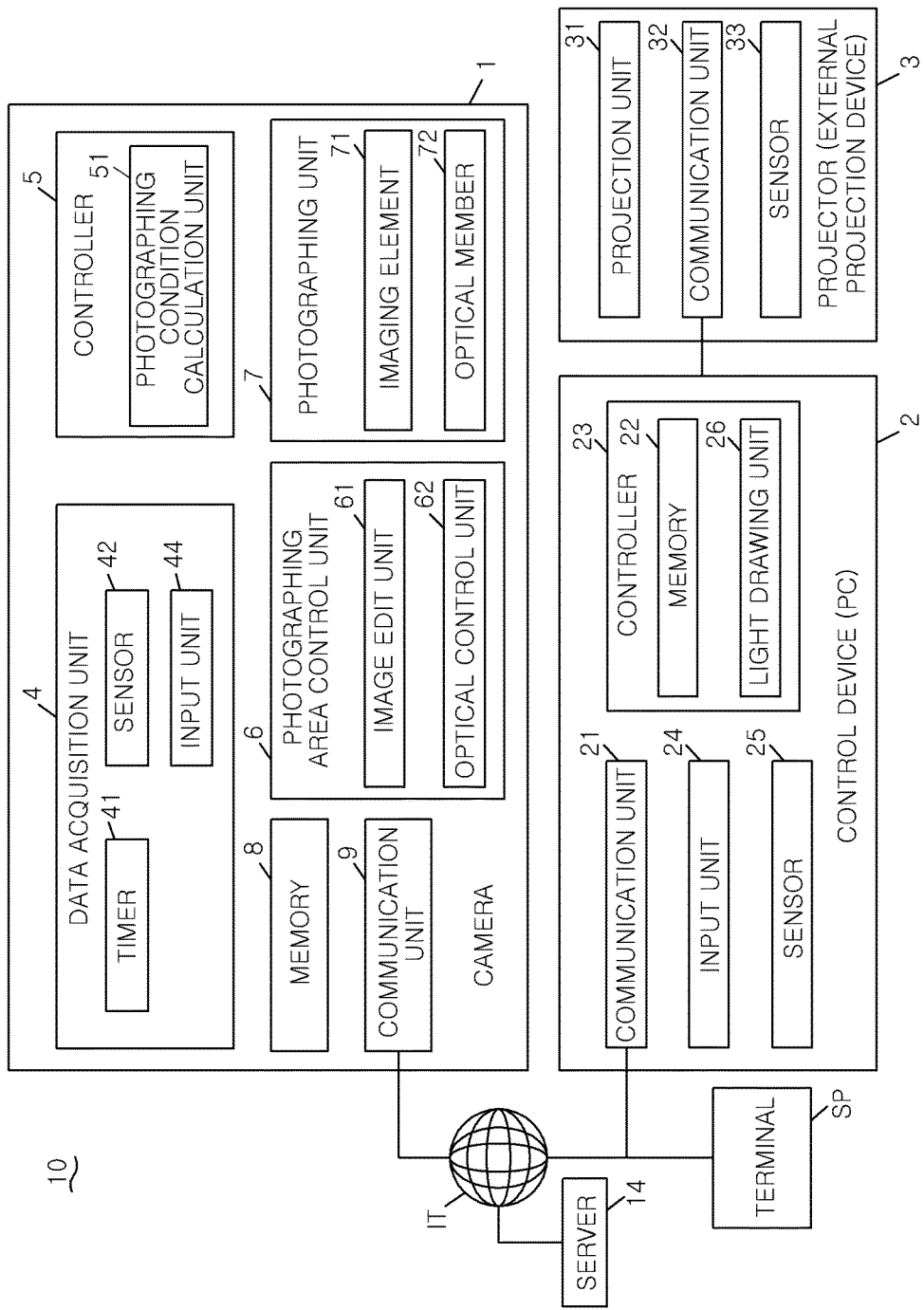

CAMERA AND ILLUMINATION SYSTEM

CROSS-REFERENCE TO RELATED APPLICATIONS

This application claims priorities to Japanese Patent Application No. 2014-186198 filed on Sep. 12, 2014 and Japanese Patent Application No. 2014-186200 filed on Sep. 12, 2014, the entire contents of which are incorporated herein by reference.

TECHNICAL FIELD

The disclosure relates to a camera for transmitting an image data to a projection device for projecting a light onto an object installed in an arbitrary space and an illumination system for performing illumination by using the image data transmitted from the camera.

BACKGROUND ART

Conventionally, in producing a product exhibition in a show window, a stage performance in event facilities, or the like, there has been used illumination presentation which is based on a technique of projecting light from an illumination apparatus such as a spotlight onto an object in order to attract attention of customers or audience and strengthen the impression of the product or the performance. As for a system for performing such illumination presentation, there is known an illumination system for selecting one or more base shapes of an illumination light from a preset base shape group by user's manipulation and determining one or more positions of one or more base shapes of the illumination light such that an object is covered by the illumination light (see, e.g., Japanese Patent No. 5319999).

In the above illumination apparatus, the light is irradiated to a space or an object by using a projector that can change specifications, a shape or a size of an illumination light. In such an illumination apparatus, an image photographed by a camera may be used as the illumination light. For example, there is known a system that allows an image data photographed by a camera to be transmitted to a server via the Internet and used for various purposes (see, Japanese Unexamined Patent Application Publication No. 2009-157897).

In the illumination performance using the image as the illumination light, an image of a shadow of a tree is used, for example, as the illumination light, so that a user can relax while imaging a forest. By connecting a projector and a camera installed in the forest via the Internet, the image of the shadow which is photographed in real time by the camera can be used for the illumination performance. Since, however, the position of the shadow is temporally changed, a desired image may not be obtained. Further, for example, when an image of a tree smaller than the actual tree is projected, a user may feel strange due to lack of reality and natural illumination presentation cannot be performed.

SUMMARY OF THE INVENTION

In view of the above, the disclosure provides a camera capable of obtaining a desired image for projection in spite of temporal changes of a subject in the case of performing illumination presentation using an image obtained by the camera as an illumination light, and an illumination system for performing illumination presentation by using an image data transmitted from the camera.

The disclosure further provides a camera capable of transmitting an image data of a subject which does not look strange in size when it is projected onto an external projection device in the case of performing illumination presentation using an image obtained by the camera as an illumination light, and an illumination system for performing illumination presentation by using the image data transmitted from the camera.

According to an embodiment of the disclosure, there is provided a camera including: a data acquisition unit configured to acquire, as photographing information, at least one of time information, information on a position of the sun, information on an angle between a sunlight and a ground, and projection information of an external projection device; a photographing condition calculation unit configured to calculate a photographing condition based on the photographing information; a photographing area control unit configured to control a photographing area based on the photographing condition; a photographing unit configured to generate an image data by photographing the photographing area; and a communication unit configured to transmit the image data to the external projection device.

In this disclosure, the photographing condition is calculated based on the photographing information acquired by the data acquisition unit and the photographing area control unit controls the photographing area. Therefore, even if the subject is changed temporally, a desired image for projection can be obtained. Since the image projected onto a projection surface based on the acquired image data has the same size as that of the actual object, a user does not feel strange and natural illumination presentation can be performed.

BRIEF DESCRIPTION OF THE DRAWINGS

The figures depict one or more implementations in accordance with the present teaching, by way of example only, no by way of limitations. In the figures, like reference numerals refer to the same or similar elements.

FIG. 3 is a block diagram of the illumination system.

DETAILED DESCRIPTION

Figure 1:
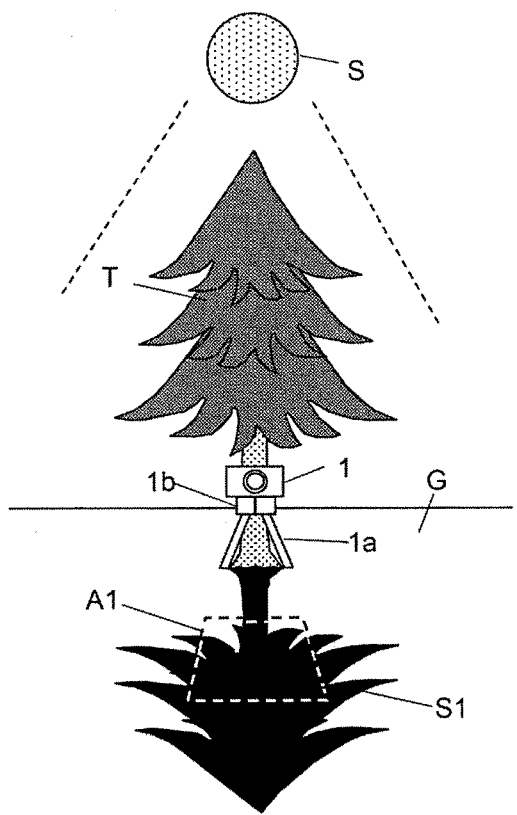
FIG. 1 shows an installation example of a camera in accordance with an embodiment.

A camera according to an embodiment and an illumination system for performing illumination presentation by using an image data transmitted from the camera will be described with reference to FIGS. 1 to 6. As shown in FIG. 1, a camera 1 of the present embodiment is installed near a tree T in a forest. The camera 1 is installed by an installation tool 1a having a movable rotation axis 1b. The camera 1 is supported by the installation tool 1a such that it can rotate at an arbitrary angle about a vertical rotation axis and has a variable angle between an optical axis thereof and a ground G. A photographing area A1 of the camera 1 includes at least a part of a shadow S1 of the tree T which is generated by a light (indicated by a dashed line) from the sun S.

Figure 2:
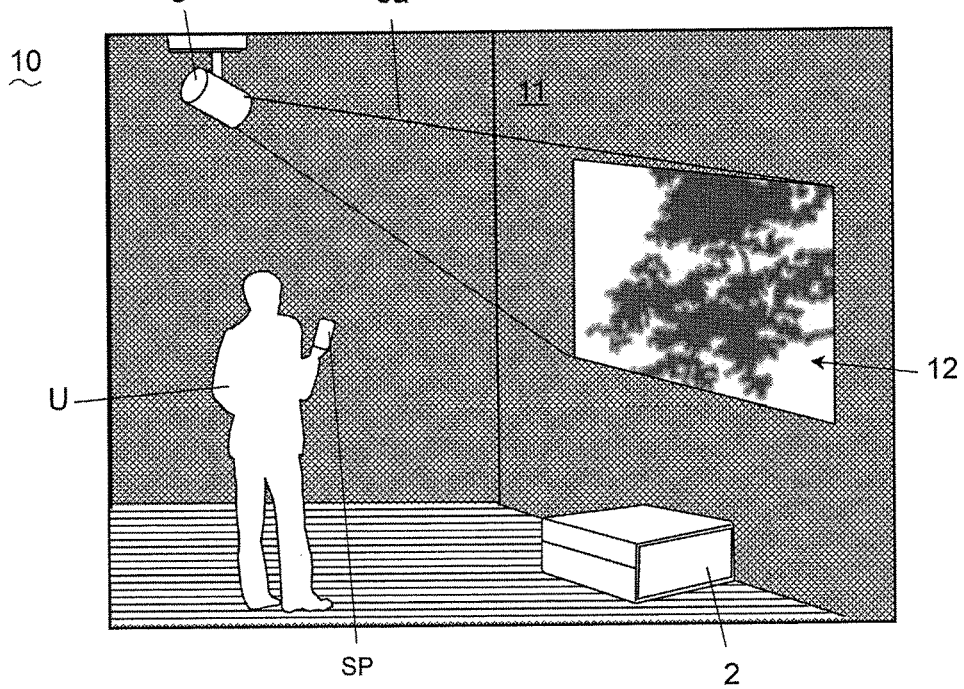
FIG. 2 shows a construction example of an illumination system for performing illumination presentation by using an image data transmitted from the camera.

As shown in FIG. 2, an illumination system 10 for performing illumination presentation by using the image data transmitted from the camera 1 is used as an illumination apparatus for irradiating a light to an arbitrary space 11 and/or an object such as a wall placed in the space 11 or the like. The illumination system 10 includes a control device 2, an external projection device (hereinafter, referred to as "projector 3") driven under the control of the control device 2, and a terminal SP for transmitting manipulation information of a user U to the control device 2. An example illustrated in FIG. 2 shows a configuration in which the control device 2 and the projector 3 are separately provided. However, the control device 2 may be partially or entirely included in the projector 3. The illumination system 10 brightly illuminates a projection surface 12 (e.g., a specific wall surface or the like) placed in the space 11 by projecting a projection light 3a from the projector 3 through manipulation of the terminal SP by the user U. Although the projection surface 12 is a wall surface in this example, the projection surface 12 is not limited thereto and may be an arbitrary object placed in the space 11.

As shown in FIG. 3, the camera 1 includes a data acquisition unit 4 for acquiring, as photographing information, at least one of time information, information on a position of the sun, and information on an angle between a sunlight and the ground G, and a controller 5 having a photographing condition calculation unit 51 for calculating a photographing condition based on the photographing information. The camera 1 further includes a photographing area control unit 6 for controlling a photographing area A1 based on the photographing condition, a photographing unit 7 for generating an image data by photographing the photographing area A1, and a communication unit 9 for transmitting the image data and/or the photographing information to the projector 3 via the control device 2. The photographing condition calculation unit 51 is driven by a microcomputer of the controller 5. The camera 1 further includes a memory 8 for storing the photographed image data.

The data acquisition unit 4 includes a timer 41 for acquiring time information, a sensor 42 for acquiring various environment information, and an input unit 44 for inputting arbitrary information. The sensor 42 includes an illuminance sensor for detecting an illuminance near the camera 1 or a distance sensor for measuring a distance to a subject. The sensor 42 may include a GPS for detecting a position of the camera 1. The input unit 44 may include an input interface for inputting information on user's manipulation, an input terminal for inputting electronic data including arbitrary environment information, e.g., weather information or the like, from an external terminal, and/or various drivers.

The photographing condition calculation unit 51 stores a general photographing condition and extracts a photographing condition corresponding to the photographing information acquired by the data acquisition unit 4. The photographing area control unit 6 includes an image edit unit 61 for generating a desired image data by trimming an image photographed by the photographing unit 7, and an optical control unit 62 for controlling an optical parameter that physically and optically affects the photographing, such as an angle of an optical axis of the camera 1 or the like.

The photographing unit 7 includes an imaging element 71 for photographing mainly the photographing area A1, and an optical member 72 for controlling light incident on the imaging element 71. As for the imaging element 71, a general-purpose CMOS image sensor, a CCD or the like is used. The optical member 72 is a so-called camera lens. A wide angle lens is properly used as the optical member 72.

The communication unit 9 transmits and receives a communication signal to and from the control device 2 (or the projector 3) via the Internet IT. For example, the communication unit 9 transmits the image data and/or the photographing information to the projector 3 via the control device 2. The communication unit 9 communicates with the Internet IT by using a wireless LAN such as WiFi (Registered Trademark), a broadband high-speed Internet such as WiMAX, or various communication standards such as CDMA 2000, W-CDMA, LEE and the like.

The control device 2 includes a communication unit 21 connected to the Internet IT, a controller 23 having a memory 22 and a light drawing unit 26, an input unit 24 for inputting information on manipulation of a user U and various electronic data, and a sensor 25 for acquiring environment information of the control device 2 and/or the projector 3. The control device 2 is realized by installing at a general-purpose personal computer an application for transmitting and receiving communication signals between the camera 1 and the projector 3 and controlling them. The sensor 25 includes an illuminance sensor for detecting an illuminance near the control device 2 and/or the projection surface 12, or a distance sensor for measuring a distance between the projection surface 12 and the projector 3. The light drawing unit 26 generates a light drawing data used for projecting, by the projector 3, the image data transmitted from the camera 1.

The terminal SP is an information terminal that can be connected to the Internet IT, e.g., a smart phone or a tablet terminal. The terminal SP may be used as the control device 2. The camera 1 and the control device 2 are connected to a server 14 on a cloud via the Internet.

The projector 3 includes a projection unit 31 for projecting an image as an illumination light. A general-purpose projector, a DLP projector or the like is suitable for the projector 3. A general metal halide lamp, an LED, a laser, or the like is suitable for a light source of the projector 3. The projector 3 further includes a communication unit 32 that allows wired/wireless communication of control signals between the control device 2 and the projector 3. The communication unit 32 has, e.g., a wiring connection terminal conforming to HDMI (Registered Trademark), a LAN system conforming to 100base-t, a wireless LAN conforming to IEEE 802.11, or the like. The projector 3 further includes a sensor 33 for detecting information on an environment near the projector 3. The sensor 33 may be a distance sensor for measuring a distance to the projection surface 12 by using an infrared ray, or the like.

Figure 4A:
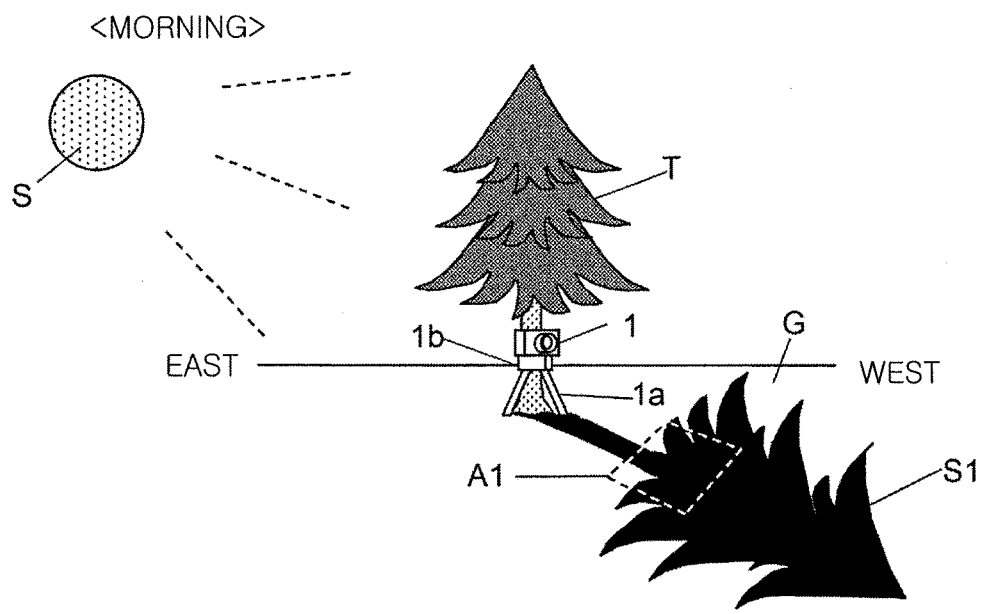
FIGS. 4A to 4C show an operation example of the camera.

The operation of the camera 1 will be described with reference to FIGS. 4A to 4C. When the data acquisition unit 4 acquires, as the photographing information, at least one of the time information, the information on the position of the sun S, and the information on an angle between a sunlight and the ground G, the photographing condition calculation unit 51 calculates the photographing condition based on the photographing information. For example, when the sun rises from the east in the morning, the shadow S1 of the tree T is projected to the west side as shown in FIG. 4A. Therefore, the camera 1 sets the west side as the photographing condition. If a path of the sun S in every season is inputted as the photographing information into the data acquisition unit 4 through the input unit 44 or the communication unit 9, the photographing condition calculation unit 51 can calculate the direction of the shadow S1 based on time and the path of the sun S. Next, a predetermined area of the shadow S1 of the tree T is extracted as the photographing area A1 based on the calculated photographing condition. The optical control unit 62 of the photographing area control unit 6 controls the direction of the optical axis of the camera 1 by driving the movable rotation axis 1b of the installation tool 1a and also controls a focal length or a pint of the optical member 72 such that the photographing area A1 can be photographed by the photographing unit 7. The imaging element 71 detects the light incident from the optical member 72 and generates an image data of the shadow S1 in the morning. The obtained image data is transmitted to the control device 2 via the communication unit 9 and the Internet IT. The communication unit 9 can transmit to the control device 2 the photographing information obtained and/or used when the image data is generated by the photographing unit 7. The light drawing unit 26 generates a light drawing data based on the image data. The projection unit 31 of the projector 3 projects a projection light 3a (i.e., illumination light) onto a predetermined projection surface 12 (wall surface in the illustrated example) in the space 11 based on the light drawing data. Accordingly, the shadow obtained in the morning is projected onto the projection surface 12.

As a predetermined period of time elapses from the photographing of the shadow S1, the morning becomes the noon and then the evening. Thus, the position of the shadow S1 of the tree T is changed and, also, the direction of the camera 1 is changed, as shown in FIGS. 4B and 4C. Accordingly, the image data is automatically generated and transmitted in the above-described manner. A desired image for projection can be obtained by the camera 1 in spite of temporal changes of the subject (the shadow S1 of the tree T), because the photographing condition is calculated based on the photographing information acquired by the data acquisition unit 4 and the photographing area A1 is controlled by the photographing area control unit 6.

Figure 4B:
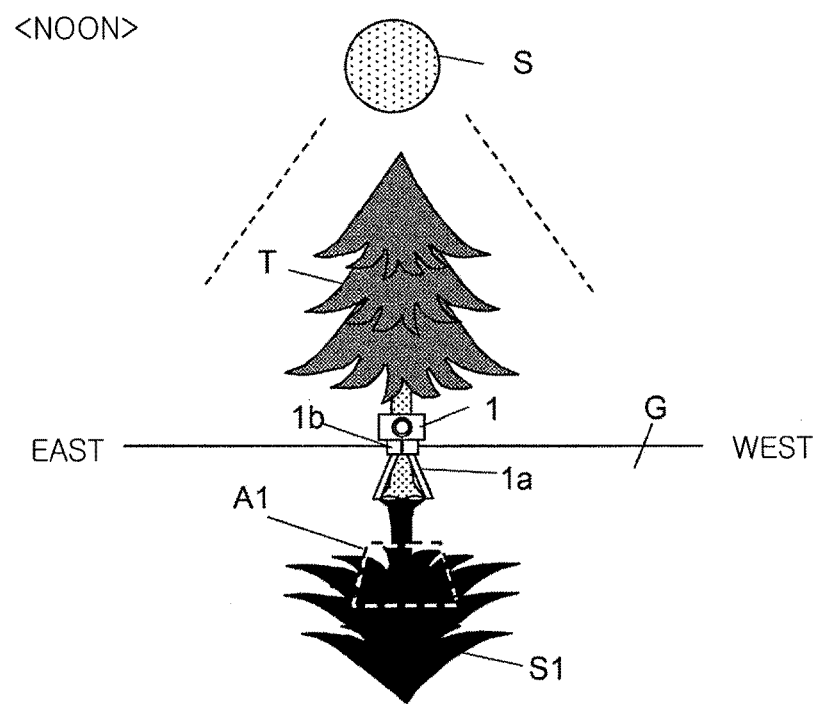
Figure 4C:
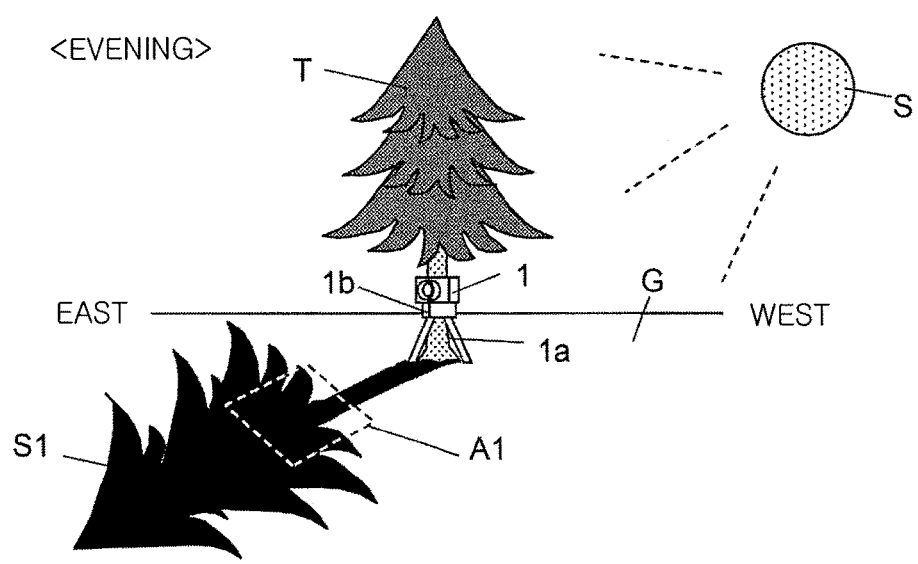
Figure 5:
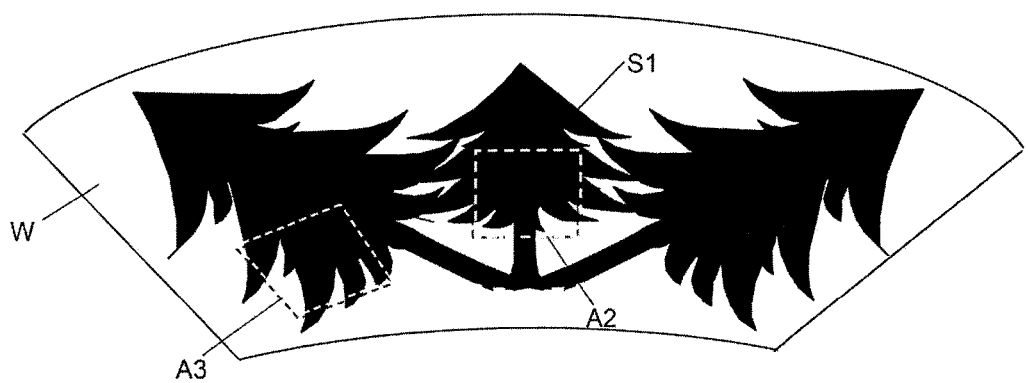
FIG. 5 shows another installation example of the camera.

In the operation example shown in FIGS. 4A to 4C, the photographing area A1 is controlled by changing the direction of the camera 1 in a hardware manner. However, the photographing area A1 may be controlled by changing the image photographed by the photographing unit 7 in a software manner. For example, a desired image for projection can be obtained by photographing a wide area W as shown in FIG. 5 by using a wide angle lens as the optical member 72 and extracting a predetermined range (e.g., a photographing area A2 at the center of the image) from the photographed image through trimming using the image edit unit 61 (see FIG. 3). The image edit unit 61 has a software that can correct distortion of the image photographed by the wide range lens. Therefore, even in the case of extracting an end portion that is considerably distorted as a photographing area A3 from the wide image, it is corrected to the same shape as that of the photographing area A1 at the center of the image.

Figure 6:
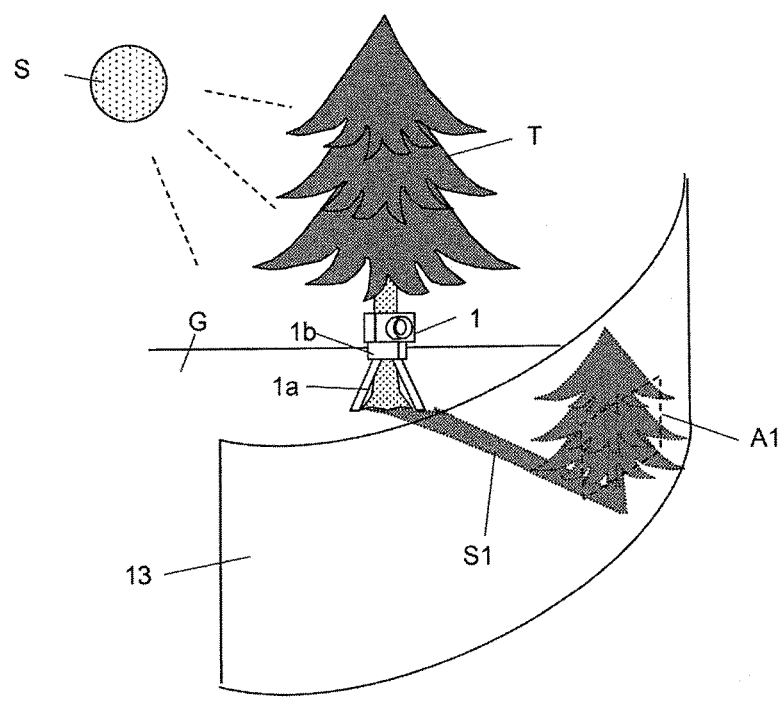
FIG. 6 shows an example of image edition in the camera.

As shown in FIG. 6, the camera 1 (the photographing unit 7) may be configured to photograph a shadow projected onto a photographing surface 13 in the photographing area. The photographing surface 13 is a plate-shaped member standing near the tree T in a direction perpendicular to the ground G. The photographing surface 13 surrounds a part of the periphery of the tree T. Generally, the ground G of the forest is uneven and the contrast of the shadow S1 is unclear. By providing the photographing surface 13 and photographing the shadow S1 projected onto the photographing surface 13, the image having a clear contrast can be obtained. If the sunlight is irradiated at a small angle, the shadow S1 projected onto the ground G become longer. As a consequence, the shape of the shadow S1 may not reflect the original shape of the tree T. In the case of using the photographing surface 13 standing in a direction perpendicular to the ground G, the shape of the tree T is projected as the shadow S1. As a result, the image of the shadow S1 which reflects the actual shape can be obtained.

Figure 7A:
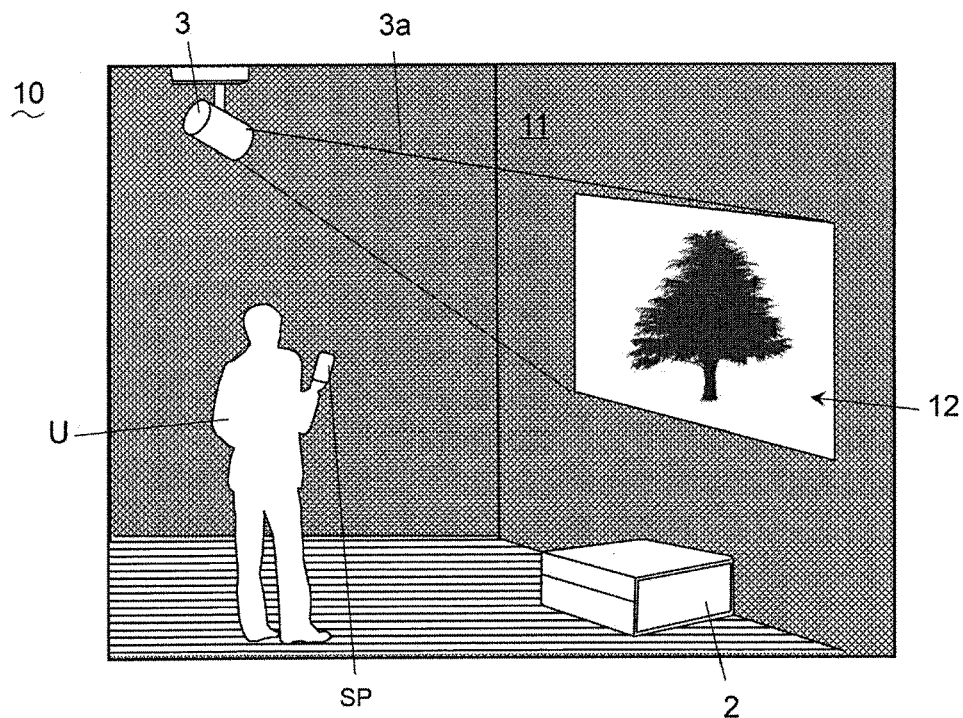
FIGS. 7A and 7B show an operation example of another illumination system using the camera.

The data acquisition unit 4 acquires, as the photographing information, the projection information of the projector 3. The projection information of the projector 3 includes, e.g., information on a size of the projection surface 12 onto which the light is projected by the projector 3. For example, when the image photographed by the photographing unit 7 contains the entire tree T, the image of the tree T which is much smaller than the actual tree T is projected by the projector 3 as shown in FIG. 7A, which lacks in reality. Therefore, the control device 2 transmits, as the projection information of the projector 3, the information on the size of the projection surface 12 onto which the light is projected by the projector 3 to the data acquisition unit 4 via the communication unit 9 of the camera 1. Then, the photographing condition calculation unit 51 extracts the photographing condition corresponding to the information on the size of the projection surface 12 acquired by the data acquisition unit 4. The photographing area control unit 6 controls the image data photographed by the photographing unit 7 or controls the setting for the photographing (e.g., setting for magnification of the optical member 72) in the photographing unit 7.

Figure 7B:
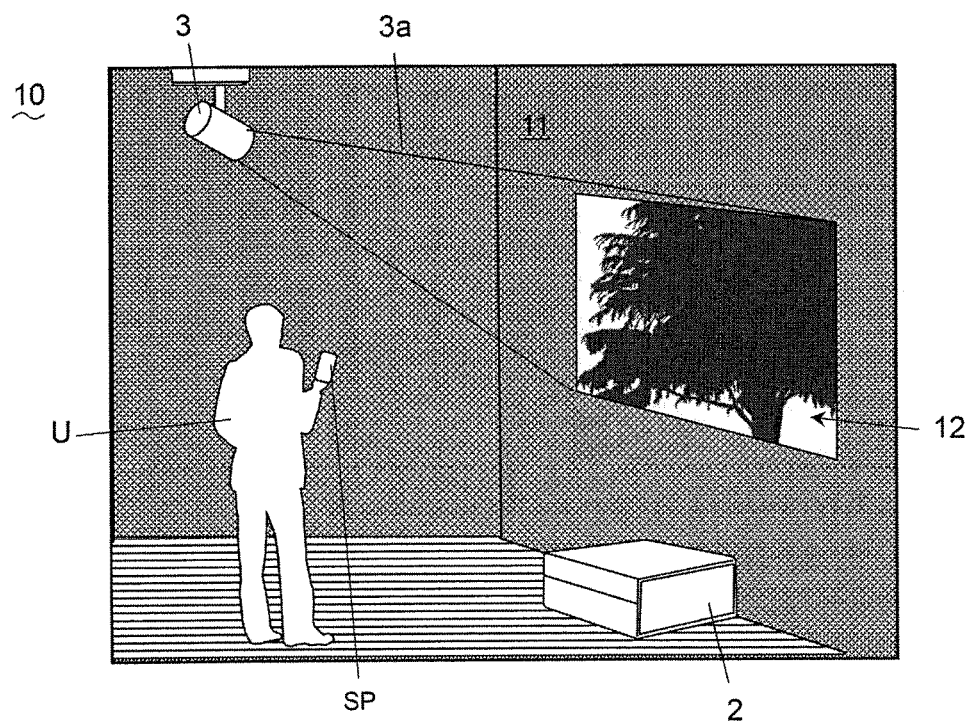

The photographing area control unit 6 edits the image data such that the shadow S1 of the tree T projected onto the projection surface 12 by the projector 3 has a size that is the same or similar to the actual size as shown in FIG. 7B. For example, the projector 3 measures the distance to the projection surface 12 by using the sensor 33, measures the size of the projection surface 12 from distribution of the projection light 3a, and transmits the photographing information on the size of the projection surface 12 to the camera 1 via the control device 2. The camera 1 measures a distance to the subject (the shadow S1 of the tree T in this example) and measure the actual size of the subject in the image data. For example, when the subject projected onto the projection surface 12 is considerably small, the image data is enlarged and partially trimmed, or the subject is photographed by increasing the magnification of the optical member 72 (lens) so that the above view angle can be obtained. In other words, the camera 1 generates the image data corresponding to the condition (i.e., the projection information) of the projector 3 having the same size as that of the projection surface 12 and transmits the image data thus generated to the projector 3 via the control device 2. Accordingly, the image projected onto the projection surface 12 has the same size as that of the actual subject and a user does not feel strange. For example, it is possible to perform natural illumination presentation as if the tree T is positioned near a window serving as the projection surface 12 and the shadow of the tree T is projected onto the window.

Figure 8:
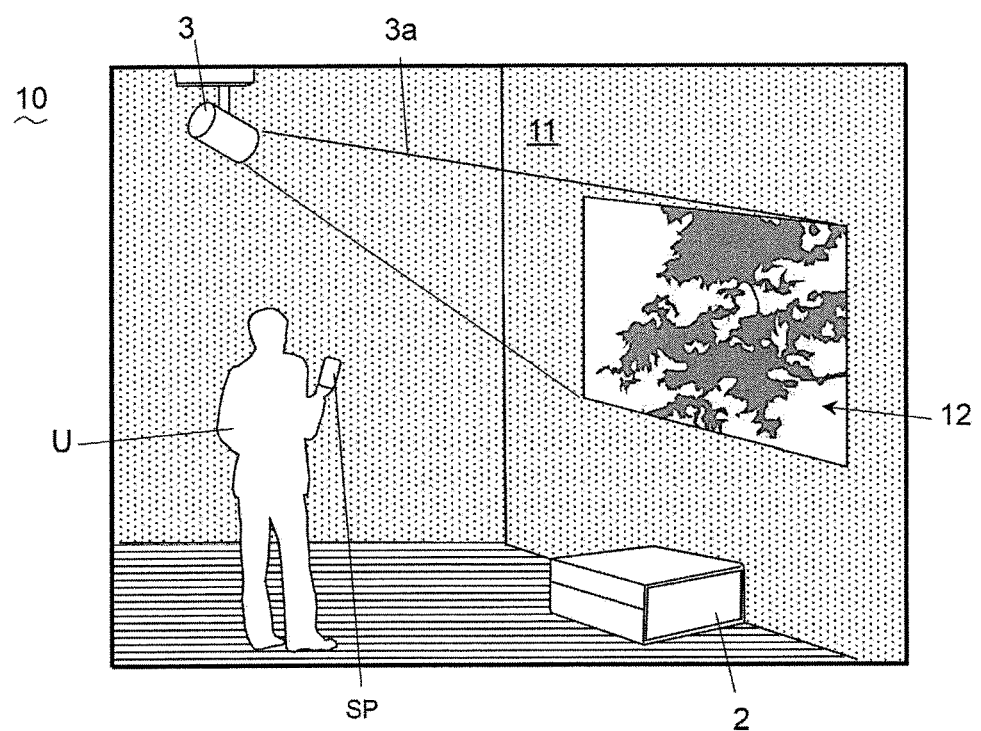
FIG. 8 shows another operation example of the illumination system.

The projection information may include information on an illuminance near the projection surface 12 onto which the light is projected by the projector. When the space 11 is bright as shown in FIG. 8, it is difficult to see the image on the projection surface 12. Therefore, the photographing area control unit 6 of the camera 1 controls the image data based on the information on the illuminance near the projection surface 12. Specifically, when an ambient illuminance is high as illustrated, the clear image can be projected onto the projection surface 12 by increasing the contrast of the image. On the other hand, when the ambient illumination is low, an image having a high contrast looks strange and causes discomfort such as glare or the like. In that case, it is preferable to decrease the contrast of the image.

Figure 9:
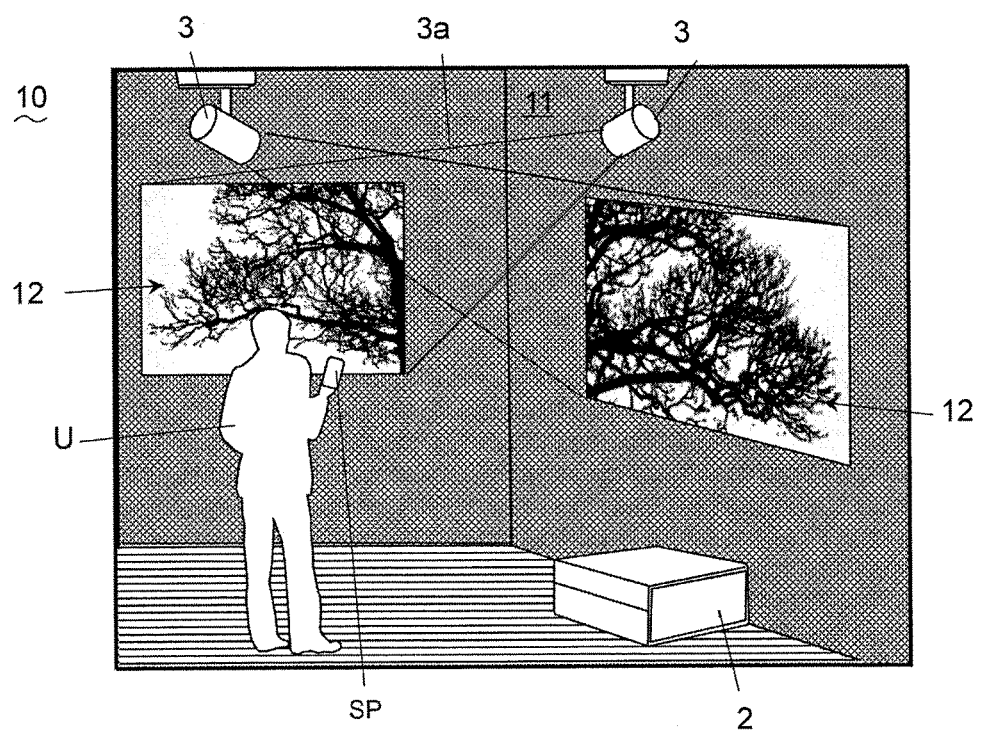
FIG. 9 shows a construction example of another illumination system using the camera.

FIG. 9 shows the construction example of another illumination system 10 using the camera 1. In the illumination system 10 of the modification, a plurality of projectors 3 is used. The photographing unit 7 of the camera 1 generates a plurality of image data by photographing a plurality of photographing areas. The communication unit 9 transmits the plurality of image data to the plurality of projectors 3 via the control device 2. Accordingly, the camera 1 can transmit the environment in different directions as the image data, which makes various illumination presentations possible. For example, when the light is projected onto two wall surfaces perpendicular to each other from the projectors 3 as shown in FIG. 9, it is possible to perform three-dimensional illumination presentation in which some branches of a tree are seen through one window and other branches are seen through the other window.

The disclosure may be variously modified without being limited to the above embodiment. The above embodiment has described the configuration example in which the image data is transmitted to the projector (the control device 2) by photographing the shadow S1 of the tree T. However, the subject is not limited to the shadow S1 of the tree T as long as the position thereof is temporally changed. In addition, a plurality of cameras 1 may be used and the projector 3 may project image data transmitted from the plurality of cameras 1.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A camera comprising:
  a data acquisition unit configured to acquire, as photographing information, at least one of time information, information on a position of the sun, information on an angle between a sunlight and a ground, and projection information of an external projection device;
  a photographing condition calculation unit configured to calculate a photographing condition based on the photographing information;
  a photographing area control unit configured to control a photographing area based on the photographing condition;
  a photographing unit configured to generate an image data by photographing the photographing area; and
  a communication unit configured to transmit the image data to the external projection device,
  wherein the photographing unit photographs a shadow of an object projected onto a photographing surface in the photographing area without photographing the object,
  wherein the shadow is a subject of the photographing unit,
  wherein the data acquisition unit is configured to acquire size information on a size of a projection surface onto which light is projected by the external projection device, and
  wherein the photographing condition calculation unit is configured to calculate the photographing condition corresponding to the size information and the photographing area control unit is configured to control settings for the photographing in the photographing unit based on the photographing condition corresponding to the size information.

2. The camera of claim 1, wherein the photographing unit is configured to generate an additional image data by photographing an additional photographing area, and
  wherein the communication unit is configured to transmit the additional image data to an additional external projection device.

3. The camera of claim 1, wherein the data acquisition unit acquires, as the photographing information, the projection information of the external projection device.

4. The camera of claim 3, wherein the projection information includes information on an illuminance near a projection surface onto which the light is projected by the external projection device.

5. The camera of claim 1, wherein the data acquisition unit acquires, as the photographing information, at least one of the time information, the information on the position of the sun, and the information on the angle between the sunlight and the ground.

6. The camera of claim 1, wherein the communication unit transmits photographing information obtained when the photographing unit generates the image data to the external projection device.

7. The camera of claim 1, wherein the communication unit transmits the image data to the external projection device via a control device.

8. The camera of claim 1, wherein the photographing surface is a plate-shaped member standing in a direction perpendicular to the ground and is placed to surround a part of a periphery of the object, and
  wherein the photographing condition includes temporal changes of the shadow.

9. An illumination system comprising:
  a camera,
  wherein the illumination system is configured to perform illumination presentation by using an image data transmitted from the camera,
  wherein the camera includes:
    a data acquisition unit configured to acquire, as photographing information, at least one of time information, information on a position of the sun, information on an angle between a sunlight and a ground, and projection information of an external projection device;
    a photographing condition calculation unit configured to calculate a photographing condition based on the photographing information;
    a photographing area control unit configured to control a photographing area based on the photographing condition;
    a photographing unit configured to generate the image data by photographing the photographing area; and
    a communication unit configured to transmit the image data to the external projection device,
    wherein the photographing unit photographs a shadow of an object projected onto a photographing surface in the photographing area without photographing the object, and
    wherein the shadow is a subject of the photographing unit,
    wherein the data acquisition unit is configured to acquire size information on a size of a projection surface onto which light is projected by the external projection device, and
    wherein the photographing condition calculation unit is configured to calculate the photographing condition corresponding to the size information and the photographing area control unit is configured to control settings for the photographing in the photographing unit based on the photographing condition corresponding to the size information.

10. The illumination system of claim 9, wherein the photographing surface is a plate-shaped member standing in a direction perpendicular to the ground and is placed to surround a part of a periphery of the object, and wherein the photographing condition includes temporal changes of the shadow.

* * * * *